United States Patent [19]

Yamamura et al.

[11] 3,725,527

[45] Apr. 3, 1973

[54] PROCESS FOR RECOVERING PURE AQUEOUS SOLUTION OF FERRIC CHLORIDE AND AQUEOUS SOLUTION OF METAL CHLORIDES FREE OF FERRIC CHLORIDE FROM FERROUS METAL MATERIAL

[75] Inventors: Toshio Yamamura; Yuichi Omote; Shiro Sato; Tomochika Hiyama, all of Kanai, Japan

[73] Assignee: Kanto Denka Kogyo Co., Ltd., Tokyo, Japan

[22] Filed: Oct. 21, 1971

[21] Appl. No.: 191,489

Related U.S. Application Data

[63] Continuation-in-part of Ser. No. 858,173, Sept. 15, 1969, Pat. No. 3,622,269.

[30] Foreign Application Priority Data

Sept. 19, 1968 Japan..............................43/67838
Sept. 20, 1968 Japan..............................43/68070

[52] U.S. Cl. ..................423/139, 423/70, 423/112, 423/491, 423/492, 423/493, 23/312 AH
[51] Int. Cl. ............................................C01g 49/10
[58] Field of Search........423/139, 493, 491, 492, 70, 423/112; 23/312 R, 312 AH

[56] References Cited

UNITED STATES PATENTS

| | | | |
|---|---|---|---|
| 3,082,062 | 3/1963 | Preuss, Jr. | 423/112 |
| 3,104,950 | 9/1963 | Ellis | 423/70 |
| 3,252,787 | 5/1966 | Shiah | 75/101 X |
| 3,254,948 | 6/1966 | Stromberg et al | 23/312 R X |
| 3,428,427 | 2/1969 | Raicevic | 23/312 R X |

*Primary Examiner*—Edward Stern
*Attorney*—Woodhams, Blanchard & Flynn

[57] ABSTRACT

Iron material consisting of iron metal having associated minor amounts of other noniron metals is reacted with hydrochloric acid solution to form an aqueous solution of metal chlorides, which solution is oxidized with oxygen or chlorine, or mixtures thereof and then the oxidized solution containing ferric chloride is subjected to liquid-liquid contact with an alkyl, aryl or aralkyl ketone or ether having four to 10 carbon atoms so that the ferric chloride is transferred to the organic extract phase, leaving the noniron metal chlorides in the aqueous raffinate, and back-extracting the organic extract with an aqueous medium and separating the thus obtained aqueous extract solution of ferric chloride.

3 Claims, No Drawings

PROCESS FOR RECOVERING PURE AQUEOUS SOLUTION OF FERRIC CHLORIDE AND AQUEOUS SOLUTION OF METAL CHLORIDES FREE OF FERRIC CHLORIDE FROM FERROUS METAL MATERIAL

CROSS REFERENCE TO RELATED CASE

This application is a continuation-in-part of our application Ser. No. 858,173, filed Sept. 15, 1969, now U.S. Pat. No. 3,622,269 issued Nov. 23, 1971.

BACKGROUND OF THE INVENTION

FIELD OF THE INVENTION

This invention relates to a process for recovering ferric chloride from an iron or steel containing minor amounts of noniron materials.

There is a great demand for pure ferric chloride uncontaminated with other metal chlorides for the purpose of producing pure iron, iron pigment and ferrite materials. There is also a great demand for the noniron chlorides as commonly are contained in iron leachates or pickling liquors, but the attendant iron contamination has heretofore been difficult to remove.

There have been several disclosures in the literature concerning methods for recovering iron values and simultaneously obtaining an aqueous solution of metal chlorides free from iron chloride from an aqueous solution of metal chlorides. For example, metallic iron is added to such aqueous solution to convert all the iron values into the ferrous state and the aqueous solution thus obtained is concentrated to separate out crystals of ferrous chloride so that the iron value is recovered as ferrous chloride crystals, while an aqueous solution of metal chlorides having a reduced iron content is obtained as the filtrate. To our knowledge, none of these known methods has been satisfactory for the separation of iron values.

SUMMARY OF THE INVENTION

We have discovered that when a hydrochloric acid aqueous solution containing ferric chloride is contacted with an alkyl, aryl or aralkyl ketone having four to 10 carbon atoms, such as methylisobutyl ketone and cyclohexanone, or an alkyl, aryl or aralkyl ether containing four to 10 carbon atoms, such as diisopropyl ether and anisole, and when the HCl concentration in said aqueous solution and/or the concentration of the other coexisting metal chloride or chlorides in said aqueous solution are (is) maintained sufficiently high, the $FeCl_3$ component alone can be easily transferred into said ketone or ether extractant and the raffinate is an aqueous solution of hydrochloric acid or metal chlorides free from ferric chloride. Then, the $FeCl_3$ in the iron-loaded organic extract will be again transferred into the water phase by contacting the organic phase with water, and an aqueous solution of pure $FeCl_3$ can be recovered.

As ketones for the extract, we have tested acetone, methylethyl ketone, diethyl ketone, methylisopropyl ketone, methylisobutyl ketone, acetylacetone, diethyl ketone, cyclopentanone, cyclohexanone, dibutyl ketone, acetophenone, phenylethyl ketone, phenylpropyl ketone, etc. and we have found that ketones having four to 10 carbon atoms such as methyl-ketones, cyclopentanone and cyclohexanone have a particularly excellent quality as an extractant. Acetone is not preferable, for it is inter-soluble with an aqueous solution of iron chloride. Methylethyl ketone among the methylketones has also such intersolubility, to some extent, but, if it is carried in a suitable solvent or carrier, for example, in kerosene or a hydrocarbon such as benzene, toluene and xylene or a chlorinated hydrocarbon such as carbon tetrachloride, trichloroethylene, tetrachloroethylene, dichloroethanes, trichloroethanes, tetrachlorethanes, monochlorobenzene and o-dichlorobenzene, a very effective extraction is possible. Furthermore, a mixture of methylethyl ketone and cyclohexanone or a mixture of these compounds with kerosene is suitable for the organic extractant. Also, we have found that ethers having 4 - 10 carbon atoms such as diethyl ether, ethylpropyl ether, dipropyl ether, diisopropyl ether, dibutyl ether, anisole, dioxanes, etc. are excellent extractants for extracting ferric chloride. With respect to ethers, like in the case of ketones, a mixture of ethers or a mixture of ethers and and such hydrocarbon or chlorinated hydrocarbon carriers as above mentioned are suitable as an extractant.

According to the present invention, iron material such as scrap iron, scrap steel or pickling solutions from the pickling of iron or steel is used as a source of hydrochloric acid aqueous chloride solution containing iron chloride and other noniron metal chlorides. The aqueous chloride solution is oxidized to convert ferrous chloride, $FeCl_2$, to ferric chloride, $FeCl_3$, thus to make a ferric chloride solution, because according to our discovery the ketone or ether extractant used in the first extracting step extracts $FeCl_3$ selectively. If the oxidation step is omitted any iron values in the form of $FeCl_2$ will be left in the raffinate.

It is required in the ferric chloride solution either that (1) at least 1 mole of free HCl to $FeCl_3$ be present in the solution or (2) that more than 1 gram equivalent of Cl ion derived from metal chlorides other than ferric chloride to $FeCl_3$ be present. The chlorine ion concentration of the aqueous starting solution of metal chlorides containing $FeCl_3$ is at least fourfold equivalent to the concentration of the ferric ion. If this is not satisfied, the distribution of $FeCl_3$ in the organic extractant phase of the first extraction is disadvantageous.

The ratio of the concentration of $FeCl_3$ in the organic phase to the aqueous phase varies greatly, depending on the ratio of HCl to $FeCl_3$ or the ratio of other noniron metal chlorides to $FeCl_3$ in the aqueous solution. As the concentration of hydrochloric acid increases, $FeCl_3$ has a tendency to be distributed to a greater extent in the organic phase. Furthermore, when other noniron metal chlorides such as $TiCl_4$, $AlCl_3$ and the like are present in substantial concentration together with or instead of hydrochloric acid, $FeCl_3$ will be more easily and efficiently extracted into the organic phase. The concentration of $FeCl_3$ in the aqueous ferric chloride solution of metal chlorides should be preferably at least 100 grams per liter. The distribution of the noniron metal chlorides to the organic extractant will decrease as the concentration of $FeCl_3$ increases.

Furthermore, if the concentration of noniron metal chlorides is high and the concentration of $FeCl_3$ is low, the inter-solubility between the aqueous phase and the organic phase will increase and sometimes a uniform phase will form rendering the separation of organic extract difficult. Accordingly, it is usually favorable that the starting aqueous ferric chloride solution of metal chlorides has a content of hydrochloric acid of 3N to 8N, and that a mixture of the ketone or ether solvent of this invention, with a suitable carrier as described above, such as a chlorinated hydrocarbon, be used as the extractant in order to decrease the intersolubility between the organic phase and the aqueous phase.

In the organic phase thus obtained in which ferric chloride is dissolved, other metal ions are contained only to a small extent. For example, even when chlorides of $Al^{3+}$, $Mg^{2+}$, $V^{4+}$, $Mn^{2+}$, $Cr^{3+}$ and the like are contained in the starting solution, they are substantially not distributed or contained in the organic phase. Though they might have some tendency of being distributed in the organic phase, they are pushed away by $FeCl_3$ from the organic phase and remain in the aqueous phase when $FeCl_3$ is distributed in a substantial amount in the organic phase. In order to utilize this phenomenon effectively, it is preferable to adopt a counter-current extraction operation, in at least two stages and usually less than six stages.

Next, from the iron-loaded organic phase, the $FeCl_3$ component will be reversely extracted to an aqueous phase by contacting said organic phase with an aqueous medium such as water. In this back extraction step, it is necessary that the concentration of hydrochloric acid or ferric chloride in the aqueous phase be low. In conducting this operation, it is also preferable to adopt a counter-current extraction operation in two to six stages.

In the extraction and separation step of ferric chloride according to the present invention, the optimum amount of the ketone or ether extractant required for the starting aqueous solution will be influenced by the concentration of hydrochloric acid, as will be apparent from the fact that the distribution ratio of $FeCl_3$ varies depending upon the concentration of hydrochloric acid in the aqueous solution. However, at least 2 moles of the ketone or ether extraction are required per 1 mole of $FeCl_3$, and when a mixed solvent of ketone and hydrocarbon or ether and hydrocarbon is used, as the extractant, similarly at least 2 moles of ketone or ether per 1 mole of $FeCl_3$ are required to achieve a complete recovery of ferric chloride value.

In the aqueous solution of ferric chloride obtained by the aforementioned reverse extraction, there will be contained a certain amount of ketone or ether used as the extractant. Therefore, said aqueous solution will be washed with kerosene or similar solvent and almost all of the ketone or ether contained therein will be removed. Also, it will be possible to heat the aqueous solution so as to evaporate a portion of the water and simultaneously remove the ketone or ether by a steam distillation.

The aqueous solution of ferric chloride thus obtained is very pure and it can be used, as it is, satisfactorily for many industrial purposes including its use as a chemical reagent such as an etching agent for printing circuits and a raw material for making iron oxide. Iron oxide which will be produced from the ferric chloride aqueous solution obtained according to our process is of a very high purity and is excellent as a material for producing ferrite raw material, pigment and reduced iron.

For example, the ferric chloride aqueous solution obtained by the aforementioned reverse extraction is subjected to a spray roasting operation at a temperature of 500° – 800° C., preferably 600° – 700° C., as it is or after a certain amount of the organic solvent remaining in the solution has been removed by such means as steam distillation. Thus, iron oxide powders of a high purity can be produced. As another example, the ferric chloride aqueous solution is first treated to remove water therefrom or further converted to iron oxide and then it is subjected to a reduction treatment in a hydrogen stream at a temperature of 600° – 900° C. Thus, a reduced iron of a high purity can be produced.

The process of this invention is applicable to the recovery of pure ferric chloride, and ultimately, if desired, pure ferrite type iron from scrap iron composed of steel and cast iron.

Scrap iron, as used herein, refers to by-products of iron and steel fabrication and worn-out, broken or discarded items of cast iron or steel. Typical examples of discarded, worn-out or broken items are discarded steel furniture, washing machines, stoves and other outdated consumer goods, beams, angles, channels, girders, railings, grilles, pipe and the like from the demolition of buildings; useless farm machinery; broken or damaged industrial machinery; old ships; railroad rails and rolling stock that have outlived their usefulness; and wrecked or worn-out automobiles. This scrap, because of its miscellaneous nature, requires extensive and careful sorting and classification to prevent the contamination of steel in the furnace with unwanted chemical elements present in some of the scrap. The complex nature of this scrap iron is indicated by the numerous different specifications covering the grades of scrap iron for use in steel making and cast iron foundries. Scrap iron of railroad origin, alone, has numerous specifications. Junked automobiles represent a large and bountiful source of scrap iron. Complicated technology has developed to sort, shred, compact and crush this scrap into recoverable iron. All these commercial sources of scrap iron on the market render the scrap characteristically contaminated with noniron metals.

Steel, itself, contains a wide variety of alloying elements such as aluminum, boron, calcium, chromium, niobium, manganese, molybdenum, nickel, titanium, tungsten, and vanadium. These elements render the steel scrap unfit for general usage, and, unless properly sorted, cause combinations that are reduced in value, if not useless.

These sources of contamination in scrap iron render it impractical as a source of pure iron by prior manufacturing methods. According to the present invention, however, this material can be leached with hydrochloric acid, and the resulting leachate oxidized and then treated with the organic solvent to extract pure ferric chloride, which can be recovered from the extract by back extraction with aqueous solvents such as water.

The pickling liquors produced as a by-product of the cast iron and steel fabrication industry are also characteristically contaminated with noniron metals, such as indicated above, and can be processed according to the invention to produce pure iron and iron compounds as described; using the liquors in the same way as the leachate noted above.

By the step of oxidation, previously indicated, the divalent ferrous ion contained in the acid leachate and pickling solutions is converted to the trivalent ferric ion. This step is carried out by introducing into the solution an oxidant such as air, oxygen, chlorine, or other oxidizing agent. In addition, the other metal ions contained in the aqueous solution will be converted to the more highly oxidized level, provided the elemental nature of the metal admits it to undergo such conversion. The oxidants employed for this purpose of maintaining the metal ions in the solution at a highly oxidized level are exemplified by the following: molecular oxygen, chlorine, hydrogen peroxide, permanganates, chromates and mixtures of gases or solutions containing one of these compounds. Of these, oxygen, oxygen-containing gas, chlorine, chlorine-containing gas, and mixtures thereof are particularly useful.

The other (noniron) metal chlorides contained in the oxidized solution are typified by vanadium, chromium, manganese, magnesium, aluminum, titanium and zinc chloride. When this solution is contacted with a ketone or ether as previously indicated, the ferric chloride will be substantially transferred selectively to the organic phase, the noniron metal chlorides remaining completely in the aqueous solution. As typical ketones or ethers, those having a boiling point of about 100° to 200° C. such as methylisobutyl ketone, cyclohexanone, diisopropyl ether and anisole are desirable, but any ketone or ether having four to 10 carbon atoms is suitable. These ketones and ethers can be easily purified and recovered by distillation, and they can be reused in the extraction operation easily, thus making the process of the present invention economically advantageous.

After extraction, the aqueous raffinate, which is an aqueous solution of the noniron metal chlorides free from ferric chloride can then be treated in a known manner to recover the contained metal values.

The invention is illustrated by the following examples.

EXAMPLE 1

An aqueous hydrochloric acid solution, obtained by blowing chlorine gas into a concentrated hydrochloric acid solution containing scrap iron, had a composition of $FeCl_3$ 525 g./l., $FeCl_2$ 62 g./l. and HCl 2.1 g./l. 1 l. of methylisobutyl ketone was mixed with 1 l. of said aqueous solution and was shaken and the organic and aqueous acidic layers were allowed to separate. Analysis of the organic phase showed that the $FeCl_3$ values transferred to the methylisobutyl ketone phase was 4.5 g.

However, when hydrochloric acid was added to the above starting aqueous solution so as to increase the HCl concentration to 120 g./l. ($FeCl_3$ mole : HCl mole = about 1 : 1) and 1 l. of methylisobutyl ketone was mixed with this solution thus obtained and shaken, an analysis of the obtained extract phase showed that the $FeCl_3$ values transferred to the methylisobutyl ketone phase increased to 219 g. Then the amount of HCl added thereto was increased, the $FeCl_3$ transferred to the methylisobutyl ketone phase was further increased. The higher the concentration of $FeCl_3$ in the methylisobutyl ketone phase is, the higher will be the concentration of $FeCl_3$ in the $FeCl_3$ aqueous solution which will be obtained by back-extracting the said organic phase with water.

Further, the above aqueous hydrochloric acid solution having the composition of $FeCl_3$ 525 g./l., $FeCl_2$ 62 g./l. and HCl 120 g./l. was subjected to a counter-current, five-stage extraction by employing 2 l. of a mixture of methylisobutyl ketone-benzene (volume ratio = 1 : 1) as an extractant to 1 l. of the above solution, instead of the above simple extraction operation, and then was subjected to a counter-current, six-stage back-extraction by employing 1 l. of water. The aqueous ferric chloride solution obtained by the back-extraction had the composition of $FeCl_3$ 523 g./l. and HCl 84 g./l. and the purity of $FeCl_3$ was 99.93 percent. This ferric chloride aqueous solution was suitable as an etching solution to be used in printing circuits, etc.

EXAMPLE 2

A waste acid from the hydrochloric acid pickling of steel had the following composition by analysis.

$FeCl_2$    240 g./l.    HCl    58 g./l.

Said waste acid was oxidized by blowing oxygen gas into said acid in order to convert $Fe^{2+}$ to $Fe^{3+}$. The solution obtained by adding hydrochloric acid to said waste acid had the following composition by analysis:

$FeCl_3$    233 g./l.    HCl    98 g./l.

To 1 l. of this solution, 1 l. of a mixture of diisopropyl ether and kerosene was mixed and shaken, and then the organic and aqueous acidic layers were allowed to separate. Analysis of the organic phase showed that 170 g. of $FeCl_3$ and 34 g. of HCl were transferred to the organic phase. Then 0.5 l. of water was added to the organic phase containing $FeCl_3$ and shaken to effect the water-stripping of the iron from the organic phase. This gave an aqueous solution of $FeCl_3$, from which 164 g. of $FeCl_3$ was recovered.

In addition, though Mn, Cr and the like were contained in the starting waste acid from the pickling process, substantially all of these elements remained in the raffinate after the above extraction with the above mixed extractant of ether and kerosene. Accordingly, Mn, Cr and other impurities were not contained in the aqueous solution of $FeCl_3$ obtained by the above back-extraction.

Further, instead of the above simple extraction operation, the above starting hydrochloric acid solution having the composition of $FeCl_3$ 233 g./l. and HCl 98 g./l. was subjected to a counter-current five-stage extraction by employing 2 l. of a mixture of methylisobutyl ketone and benzene (volume ratio = 1 : 1) as an extractant to 1 l. of the above solution and then was subjected to a counter-current six-stage back-extraction by employing 1 l. of water. The aqueous ferric chloride solution obtained by the back-extraction had the concentration of $FeCl_3$ 232 g./l. and the purity of $FeCl_3$ in this aqueous solution was 99.96 percent. This aqueous ferric chloride solution was roasted in a spray roasting furnace at 600° C. and a ferric oxide product of a high purity was obtained. Analysis of the obtained ferric oxide showed the following composition (percent by weight):

| $SiO_2$ | 0.003 | NiO | 0.014 | MgO | 0.001 | $Fe_2O_3$ |
|---|---|---|---|---|---|---|
| $Al_2O_3$ | — | CuO | 0.002 | $K_2O$ | 0.002 | 99.94% |

| | | | | | |
|---|---|---|---|---|---|
| MnO | 0.004 | CoO | 0.009 | $V_2O_5$ | — |
| CaO | 0.004 | ZnO | 0.002 | PbO | 0.002 |
| $Na_2O$ | 0.007 | $Cr_2O_3$ | 0.015 | water | — |

EXAMPLE 3

An aqueous hydrochloric acid solution, obtained by blowing chlorine gas into a concentrated hydrochloric acid solution containing scrap iron, had the following composition by analysis:

| | |
|---|---|
| $FeCl_3$ | 637 g./l. |
| HCl | 146 g./l. |
| Total $Cl^{116}$ | 15.8 g. ion/l. |
| non ferrous material | g/$Fe_2O_3$ 100 g. |
| MnO | 1.440 |
| $SiO_2$ | 0.224 |
| CuO | 0.036 |
| $Al_2O_3$ | 0.034 |
| NiO | 0.023 |
| $Cr_2O_3$ | 0.018 |
| ZnO | 0.010 |
| CoO | 0.010 |
| $Na_2O$ | 0.008 |
| C | 0.035 |

By using 2 l. of a mixture of methylisobutylketone-benzene (volume ratio = 1 : 1) as an extractant to 1 l. of the above mentioned solution, a counter-current five-stage extraction was carried out. The organic phase obtained by this extraction was back-extracted by a counter-current six-stage extraction by using 1 l. of water and an aqueous solution containing $FeCl_3$ in a concentration of about 518 g./l. was obtained.

This aqueous $FeCl_3$ solution was heated to evaporate a portion of the water and simultaneously remove the remaining methylisobutyl ketone and benzene.

The obtained aqueous solution of $FeCl_3$ had the following composition by analysis:

| | |
|---|---|
| $FeCl_3$ | 624 g./l. |
| HCl | 102 g./l. |
| Total $Cl^{116}$ | 14.4 g ion/l. |
| non ferrous material | g/$Fe_2O_3$ 100 g. |
| MnO | 0.001 |
| $SiO_2$ | 0.000 |
| CuO | 0.001 |
| $Al_2O_3$ | 0.000 |
| NiO | 0.004 |
| $Cr_2O_3$ | 0.004 |
| ZnO | 0.001 |
| CoO | 0.008 |
| $Na_2O$ | 0.000 |
| C | 0.000 |

The above mentioned aqueous $FeCl_3$ solution was heated to completely evaporate water and iron oxide was obtained.

This iron oxide was calcined at a temperature of 650° C. for 2 hours to remove trace chloride, and was crushed.

300 g. of the thus obtained iron oxide were fed in a pusher furnace having a heating zone of 0.2 m. × 0.3 m. × 3 m. and maintained at 600° – 900° C. and subjected to a reduction treatment by passing hydrogen at 2 l./min. for 6 hours. After the reduction reaction, it was annealed in a hydrogen stream at 800° C. for one hour and crushed, obtaining 210 g. of iron powder. The analytical values of the obtained iron powder were as follows:

| | | | | | |
|---|---|---|---|---|---|
| Fe | 99.93% | Co | 0.022 | Mn | 0.004 |
| Al | 0.001 | Cu | 0.005 | Ni | 0.013 |
| Cr | 0.020 | Pb | 0.002 | V | 0.002 |
| | | | | Zn | 0.002 |

EXAMPLE 4

A waste acid from the hydrochloric acid pickling of steel had the following composition by analysis:

| | |
|---|---|
| $FeCl_2$ | 312 g./l. |
| $FeCl_3$ | 3 g./l. |
| HCl | 28.9 g./l. |
| non ferrous material | g/$Fe_2O_3$ 100 g. |
| $SiO_2$ | 0.264 |
| NiO | 0.023 |
| CuO | 0.012 |
| MnO | 0.340 |
| CoO | 0.004 |
| ZnO | 0.004 |
| $Cr_2O_3$ | 0.015 |
| PbO | 0.002 |
| CaO | 0.026 |
| MgO | 0.009 |
| $Na_2O$ | 0.015 |
| $Al_2O_3$ | 0.030 |

Said waste acid was oxidized by blowing oxygen gas into said acid in order to convert $Fe^{2+}$ to $Fe^{3+}$. The solution obtained by adding hydrochloric acid to said oxidized waste acid solution had the composition of $FeCl_3$ 393 g./l. and HCl 89.5 g./l.

By using 1 l. of a mixture of methylisobutyl ketone-benzene (volume ratio = 1 : 1) as an extractant to 1 l. of the above mentioned solution, a counter-current five-stage extraction was carried out.

The organic phase obtained by this extraction was back-extracted by a counter-current six-stage extraction by using 0.5 l. of water.

The thus obtained aqueous solution containing $FeCl_3$ was heated to evaporate a portion of the water and simultaneously remove the remaining methylisobutyl ketone and benzene.

This aqueous $FeCl_3$ solution had the following composition by analysis:

| | |
|---|---|
| $FeCl_3$ | 385 g./l. |
| HCl | 75 g./l. |
| non ferrous material | g/$Fe_2O_3$ 100 g. |
| $SiO_2$ | 0.000 |
| NiO | 0.004 |
| CuO | 0.001 |
| MnO | 0.001 |
| CoO | 0.002 |
| ZnO | 0.001 |
| $Cr_2O_3$ | 0.004 |
| PbO | 0.001 |
| CaO | 0.003 |
| MgO | 0.000 |
| $Na_2O$ | 0.001 |
| $Al_2O_3$ | 0.000 |

The thus obtained aqueous $FeCl_3$ solution was of a very high purity.

EXAMPLE 5

An aqueous hydrochloric acid solution, obtained by blowing chlorine gas into a concentrated hydrochloric acid solution containing scrap iron, had the following composition by analysis:

| | |
|---|---|
| $FeCl_3$ | 486 g./l. |
| $SiO_2$ | 14.5 g./l. |
| $MnCl_2$ | 6.8 g./l. |
| $NiCl_2$ | 43.9 g./l. |
| $CrCl_3$ | 18.0 g./l. |
| $VCl_4$ | 1.5 g./l. |
| $ZnCl_2$ | 0.2 g./l. |
| HCl | 112 g./l. |

By using 1 l. of a mixture of methylisobutyl ketone-benzene (volume ratio = 1 : 1) as an extractant to 1 l. of the above mentioned leachate solution, a counter-current fivelstage extraction was carried out.

The organic phase obtained by this extraction was back-extracted by a counter-current six-stage extraction by using 0.5 l. of water and an aqueous solution containing $FeCl_3$ in a concentration of about 484 g./l. was obtained. The purity of $FeCl_3$ in this aqueous solution was 99.96 percent.

On the other hand, an aqueous solution mainly containing $CrCl_3$ was obtained as the raffinate, in which the $FeCl_3$ concentration was reduced to less than 0.05 g./l.

The thus obtained aqueous solution mainly containing $CrCl_3$ had the following composition by analysis:

| | |
|---|---|
| $CrCl_3$ | 179 g./l. |
| $NiCl_2$ | 43.5 g./l. |
| $SiO_2$ | 14.5 g./l. |
| $MnCl_2$ | 6.5 g./l. |
| $VCl_4$ | 1.2 g./l. |
| $ZnCl_2$ | 0.2 g./l. |
| HCl | 45.1 g./l. |

The above mentioned aqueous solution was hydrolyzed, calcined, and crushed. The thus obtained $Cr_2O_3$ and $NiO_2$ had a grade to be used as additives to ferrite materials.

The embodiments of the invention in which an exclusive property or privilege is claimed are defined as follows:

We claim:

1. A process for recovering separately (A) an essentially pure aqueous solution of ferric chloride and (B) an aqueous solution of metal chlorides substantially free from ferric chloride, which comprises:
   1. dissolving with hydrochloric acid an iron material containing iron and other metal compounds to obtain an initial acid solution, said material being selected from the group consisting of iron and steel and mixtures thereof, said iron and steel having associated noniron metals;
   2. contacting the initial acid solution with an oxidizing agent selected from the group consisting of molecular oxygen and chlorine and mixtures thereof to oxidize ferrous iron present in said initial acid solution into ferric iron;
   3. maintaining (a) the chlorine ion concentration of said initial acid solution at least fourfold equivalent to the concentration of ferric ion, (b) the amount of said hydrochloric acid at least 1 molar equivalent to the amount of the ferric chloride present in said initial acid solution and (c) the ferric chloride concentration in said initial acid solution at least more than 100 g./l.;
   4. contacting the thus obtained initial acid solution with at least a twofold stoichiometric molar equivalent, based on the amount of the ferric chloride present in said initial acid solution, of at least one organic extractant selected from the group consisting of ketones and ethers having from four to 10 carbon atoms, dissolved in an organic carrier solvent selected from the group consisting of hydrocarbons and chlorinated hydrocarbons, thus to extract ferric chloride values from said initial acid solution in the organic phase;
   5. separating the resulting iron-containing organic extract from the aqueous solution of metal chlorides substantially free from ferric chloride as the raffinate;
   6. contacting said organic extract with an aqueous medium to back extract the ferric chloride values from said organic extract; and
   7. separating the thus obtained aqueous extract solution of ferric chloride from the substantially iron-free organic solvent.

2. The process of claim 1 in which the iron material is scrap iron.

3. The process of claim 1 in which the step (1) consists of a steel pickling step and the solution produced in said step is a steel pickling solution.

* * * * *